(12) United States Patent
Sepulveda et al.

(10) Patent No.: US 12,455,075 B2
(45) Date of Patent: Oct. 28, 2025

(54) GAS TURBINE PREDICTIVE EMISSIONS MODELING, REPORTING, AND MODEL MANAGEMENT VIA A REMOTE FRAMEWORK

(71) Applicant: Solar Turbines Incorporated, San Diego, CA (US)

(72) Inventors: Henry P. Sepulveda, San Diego, CA (US); Brandon W. Stein, El Cajon, CA (US); Jamaal A. Sanders, La Mesa, CA (US); Stephen E. Theron, San Diego, CA (US); Nathan J. Kirksey, San Diego, CA (US); Ivan R. Carlos, San Diego, CA (US); Christian Di Norscia, Santee, CA (US); Karunakaran Thirumangalam Nadadur, San Diego, CA (US); Vishwas Banglore Vijay Kumar, San Diego, CA (US); John Charles Torres, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 790 days.

(21) Appl. No.: 17/703,726

(22) Filed: Mar. 24, 2022

(65) Prior Publication Data
US 2023/0304664 A1 Sep. 28, 2023

(51) Int. Cl.
*F23N 5/18* (2006.01)
*F23N 5/02* (2006.01)
*G06N 20/00* (2019.01)

(52) U.S. Cl.
CPC ............ *F23N 5/184* (2013.01); *F23N 5/022* (2013.01); *G06N 20/00* (2019.01); *F23N 2005/181* (2013.01)

(58) Field of Classification Search
CPC ............... F23N 5/184; F23N 2005/181; F23N 2225/04; F23N 2900/05181; G06N 20/00; F02C 9/00; G01M 15/14
(Continued)

(56) References Cited

U.S. PATENT DOCUMENTS 8,972,067 B2 3/2015 Holt et al.
9,274,520 B2 3/2016 Ali et al.
(Continued)

FOREIGN PATENT DOCUMENTS

CA 3119273 A1 * 5/2020 ............ G01C 21/20
CN 1864032 A * 11/2006 ............... F23C 9/00
(Continued)

*Primary Examiner* — Allen R. B. Schult
*Assistant Examiner* — William C Weinert

(57) ABSTRACT

It is important to accurately measure the emissions of a turbomachine for a variety of reasons. However, continuous emission monitoring systems (CEMS) can be expensive to install and maintain. Accordingly, a digital platform is disclosed that hosts physics-based and/or statistical models that can be tailored to specific turbomachines and calibrated over the life of the turbomachine. The model for a turbomachine can be applied to data collected from the turbomachine to predict the emissions of the turbomachine. This enables monitoring of emissions, remotely and without the need of a CEMS. In addition, the platform may utilize the predicted emissions for alerts, compliance monitoring, health monitoring, control of the turbomachine, reporting, and/or the like.

17 Claims, 3 Drawing Sheets

(58) Field of Classification Search
USPC .......................................................... 431/21
See application file for complete search history.

(56) References Cited

U.S. PATENT DOCUMENTS

| | | | |
|---|---|---|---|
| 10,107,495 B2 * | 10/2018 | Minto | F23N 1/00 |
| 2010/0325071 A1 | 12/2010 | Roverso | |
| 2012/0283988 A1 | 11/2012 | Pandey et al. | |
| 2013/0158832 A1 * | 6/2013 | Moeckly | F02C 9/00 |
| | | | 701/101 |
| 2020/0372588 A1 * | 11/2020 | Shi | G06N 20/00 |
| 2021/0190364 A1 * | 6/2021 | Lee | G05B 13/027 |
| 2022/0308903 A1 * | 9/2022 | Chakraborty | G06F 3/04817 |

FOREIGN PATENT DOCUMENTS

| | | | | |
|---|---|---|---|---|
| CN | 105745497 A * | 7/2016 | | F02C 9/34 |
| CN | 111691985 A | 9/2020 | | |
| JP | 2003184577 A * | 7/2003 | | |
| WO | WO-2011064143 A2 * | 6/2011 | | F02C 9/00 |
| WO | WO-2022053936 A1 * | 3/2022 | | F23N 5/265 |

* cited by examiner

300

GAS TURBINE PREDICTIVE EMISSIONS MODELING, REPORTING, AND MODEL MANAGEMENT VIA A REMOTE FRAMEWORK

TECHNICAL FIELD

The embodiments described herein are generally directed to monitoring emissions of a turbomachine, and, more particularly, to predictive emissions modeling, reporting, and model management for gas turbine engines via a remote framework.

BACKGROUND

It is important to measure and monitor the emissions output by machines such as turbomachines, including gas turbine engines and gas compressors. For gas turbine engines, these emissions commonly include nitrogen oxides (NOx), carbon monoxide (CO), unburnt hydrocarbons (UHC), and/or carbon dioxide ($CO_2$). In the United States, such emissions are regulated by federal rules, such as Parts 60, 61, and 63 of Title 40 of the Code of Federal Regulations.

A continuous emission monitoring system (CEMS) can be installed on a turbomachine to measure the emissions of the turbomachine. A typical CEMS comprises probes and analyzers to measure gas concentrations within an emissions flow. For example, U.S. Pat. Nos. 9,274,520 and 10,107,495 disclose the monitoring of emissions using a CEMS. However, a CEMS can be expensive in terms of installation and maintenance. In particular, a trained technician must continually and manually calibrate the CEMS on site.

The present disclosure is directed toward overcoming one or more of the problems discovered by the inventors.

SUMMARY

In an embodiment, a method for monitoring emissions of a turbomachine comprises using at least one hardware processor to: store a model configured to predict emissions of a remote turbomachine based on one or more parameters of the turbomachine; over a plurality of iterations, receive data from the remote turbomachine over at least one network, wherein the data include values of the one or more parameters, apply the model to the values of the one or more parameters to output predicted emissions of the turbomachine, and add the predicted emissions to an emissions history for the remote turbomachine in a memory; and monitor the emissions history for compliance with at least one emissions requirement.

In an embodiment, a system comprises: at least one hardware processor; and software configured to, when executed by the at least one hardware processor, store a model configured to predict emissions of a remote turbomachine based on one or more parameters of the turbomachine, over a plurality of iterations, receive data from the remote turbomachine over at least one network, wherein the data include values of the one or more parameters, apply the model to the values of the one or more parameters to output predicted emissions of the turbomachine, and add the predicted emissions to an emissions history for the remote turbomachine in a memory, and monitor the emissions history for compliance with at least one emissions requirement.

In an embodiment, a non-transitory computer-readable medium has instructions stored thereon, wherein the instructions, when executed by a processor, cause the processor to: store a model configured to predict emissions of a remote turbomachine based on one or more parameters of the turbomachine; over a plurality of iterations, receive data from the remote turbomachine over at least one network, wherein the data include values of the one or more parameters, apply the model to the values of the one or more parameters to output predicted emissions of the turbomachine, and add the predicted emissions to an emissions history for the remote turbomachine in a memory; and monitor the emissions history for compliance with at least one emissions requirement.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
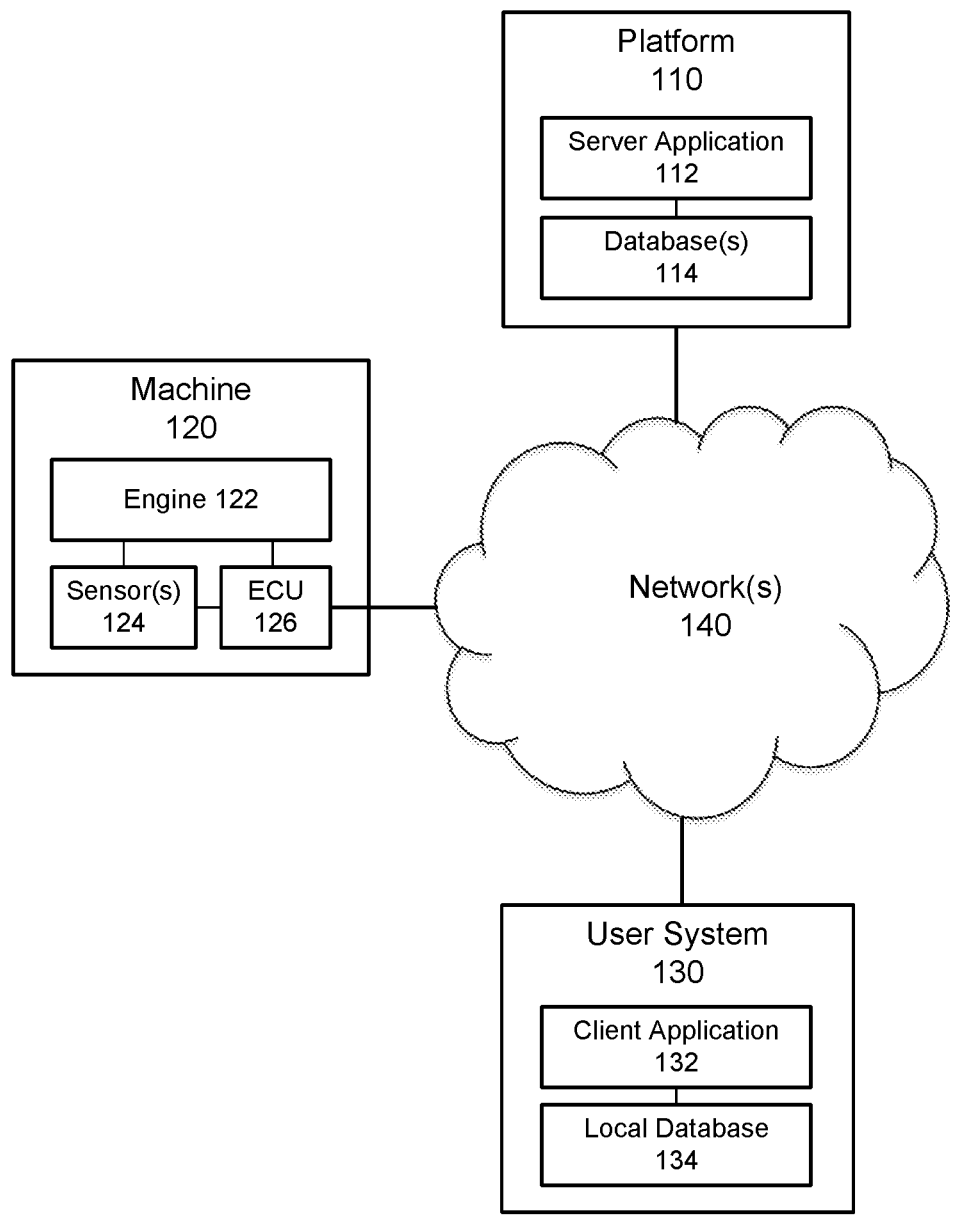
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise a computing cloud that allocates the resources of one or a plurality servers across different applications. These servers may be collocated and/or geographically distributed. Platform 110 may also comprise or be communicatively connected to a server application 112 and/or one or more databases 114. In addition, platform 110 may be communicatively connected to one or more machines 120 and/or one or more user systems 130 via one or more networks 140. While only a single instance of machine 120 and a single instance of user system 130 are illustrated, it should be understood that the infrastructure may comprise any number of machines 120 and any number of user systems 130, communicatively coupled to platform 110 via network(s) 140.

Network(s) 140 may comprise the Internet, and platform 110 may communicate with machine(s) 120 and/or user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 140, it should be understood that platform 110 may be connected to the various systems via different sets of one or more networks. For example, platform 110 may be connected to a subset of machines 120 and/or user systems 130 via the Internet, but may be connected to one or more other machines 120 and/or user systems 130 via an intranet.

Each machine 120 may be a turbomachine, such as a gas turbine engine or gas compressor (e.g., in a pipeline). Alternatively, machine 120 may be another type of machine. It is generally contemplated that machine 120 comprises an engine 122 that outputs emissions. Various operating parameters of engine 122 may be sensed by one or more sensors 124 within machine 120 and collected by an electronic control unit (ECU) 126. In addition, control parameters for controlling one or more subsystems of machine 120 may be supplied to or derived by (e.g., based on the collected operating parameters) ECU 126. ECU 126 may transmit the parameter values of the operating and/or control parameters to platform 110 for analysis by server application 112 and/or storage in database 114. It should be understood that ECU 126 may send the parameter values to platform 110 as raw data or may perform pre-processing on the data and send the parameter values to platform 110 as pre-processed data.

Each user system 130 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that each user system 130 is the personal or work device of a user that operates, manages, assesses, and/or otherwise has an interest in the emissions of machine 120. Different users with different roles may utilize their particular user systems 130 to interact with server application 112 on platform 110 in accordance with their individual roles, as defined by a user account with platform 110. Each user system 130 may comprise or be communicatively connected to a client application 132 and/or one or more local databases 134.

Platform 110 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface, which may be generated by server application 112, in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 140, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110.

As mentioned above, platform 110 may comprise, be communicatively coupled with, or otherwise have access to one or more database(s) 114. For example, platform 110 may comprise one or more database servers which manage one or more databases 114. Server application 112 executing on platform 110, and/or client application 132 executing on user system 130, may submit data (e.g., user data, form data, any of the user input or other data described herein, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external systems, and provide responses in extensible Markup Language (XML), JavaScript Object Notation (JSON), and/or any other suitable or desired format. In such embodiments, platform 110 may provide an application programming interface (API) (e.g., implemented by a Representation State Transfer (REST) architecture) which defines the manner in which machine(s) 120, user system(s) 130, and/or other external system(s) may interact with the web service. Thus, user system(s) 130 and/or other external systems (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In this case, client application 132 may generate the graphical user interface and access functionality on platform 110 via the API.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages, managing database functions, and providing all backend functionality. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

Figure 2:
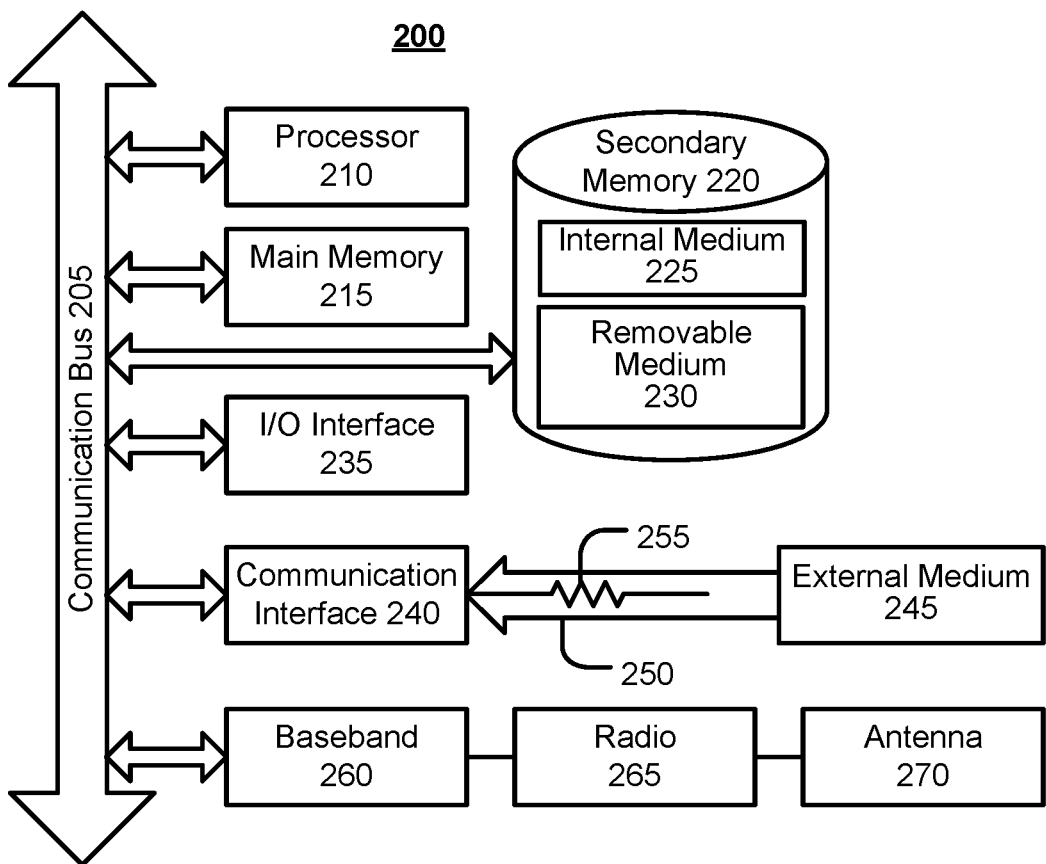
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of platform 110, ECU 126, user system(s) 130, external system(s) such a monitoring systems, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus. Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 140) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 140), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network (e.g., in the case of user system 130). The wireless communication components comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
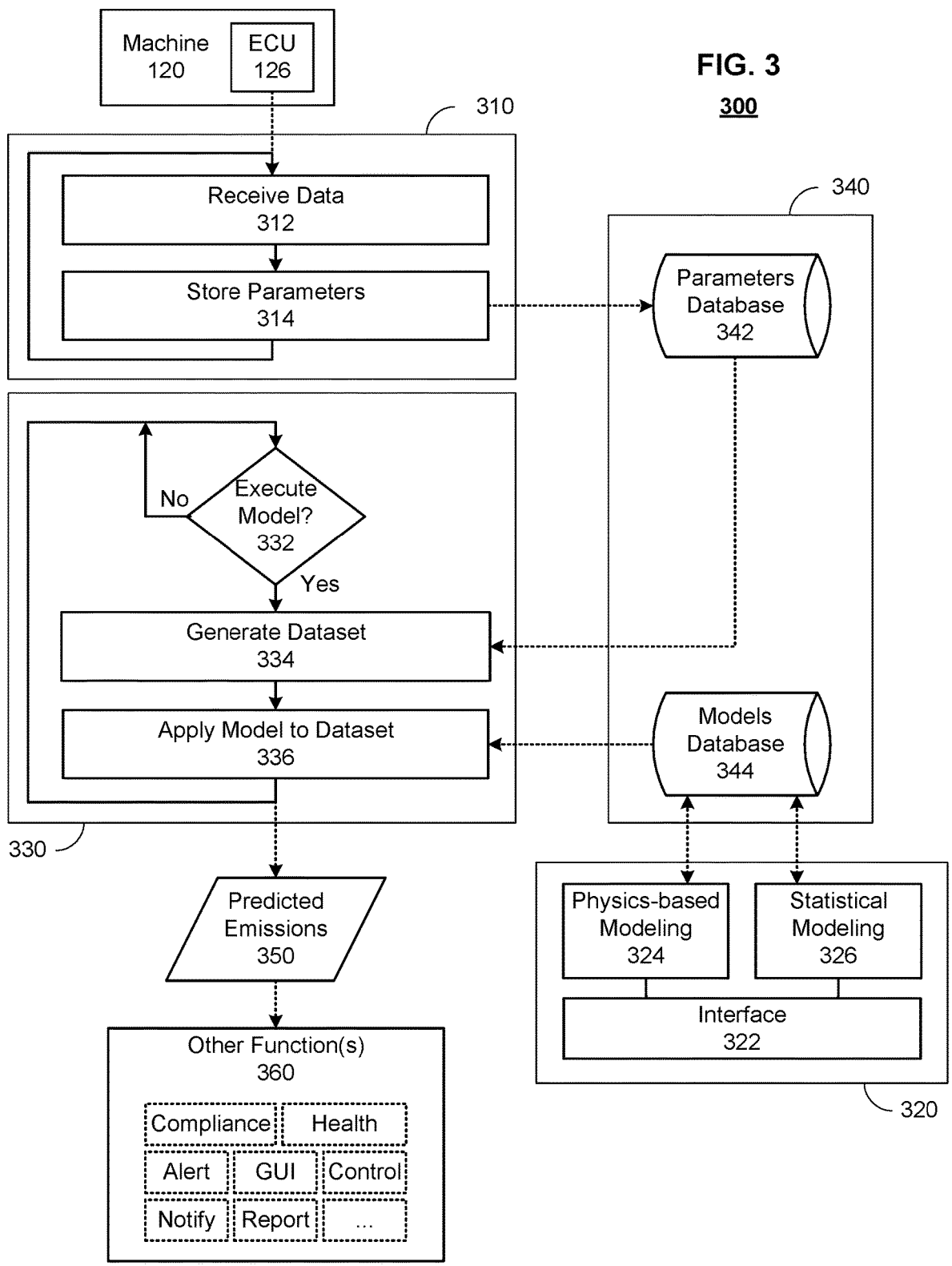
FIG. 3 illustrates an example architecture of processes, according to an embodiment.

FIG. 3 illustrates an example architecture 300 of processes, according to an embodiment. In particular, architecture 300 may comprise a data-collection process 310, a modeling process 320, and a model-execution process 330. Data-collection process 310, modeling process 320, and model-execution process 330 may be implemented on platform 110, for example, within the same server application 112 or within separate server applications 112. It should be understood that, although some processes may rely on data produced by other processes, each of data-collection process 310, modeling process 320, and model-execution process 330 may execute independently of the other processes. In addition, while the processes are illustrated with a certain arrangement and ordering of subprocesses, each process may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In an embodiment, ECU 126 of machine 120 transmits data, which has been collected for machine 120, to data-collection process 310. This data may comprise values of a plurality of parameters, including operating parameters that are output by or derived from sensor(s) 124 and control parameters that are used to control subsystems of machine 140. ECU 126 may transmit this data periodically, may stream the data in real time, or may stream some data in real time while transmitting other data periodically. In the case of periodic transmission, the data may automatically transmitted after predetermined intervals of time, transmitted in response to an event occurring at machine 120 (e.g., change in state or parameter values), transmitted in response to a request sent by platform 110 or another system, and/or the like. ECU 126 may "push" the data to data-collection process 310, for example, via an API provided by platform 110. Alternatively, data-collection process 310 may "pull" the data, for example, via an API provided by ECU 126 or by a monitoring system that relays data from ECU 126. It should be understood that the transmission of data from ECU 126 to data-collection process 310 may be performed over network(s) 140. In addition, as used herein, the term "real time" encompasses events that occur simultaneously, as well as events that are separated by ordinary delays resulting from processing latencies, network latencies, and/or the like.

In an embodiment, a monitoring system between ECU 126 and platform 110 may pre-process data before relaying the data to platform 110. Thus, it should be understood that when ECU 126 is described as transmitting data to platform 110, this includes the possibility of ECU 126 transmitting data to an intermediate system that relays the data, with or without pre-processing, to platform 110. It should also be understood that, in an alternative embodiment, some or all of the data may be transmitted by a system other than ECU 126. For example, sensors 124 may transmit data directly to platform 110 or relay the data through a monitoring system.

In subprocess 312, data-collection process 310 receives the data transmitted by ECU 126 (e.g., potentially pre-processed as discussed above). Data-collection process 310 may execute continuously to process the data, in real time, as the data are received. Alternatively, data-collection process 310 may operate periodically (e.g., after predetermined intervals of time or in response to an event or request) to process the received data in batches. The received data may comprise the value of one or more parameters of engine 122 or other components of machine 120, including operating and/or control parameters of engine 122.

In subprocess 314, the values of one or more parameters may be parsed from the received data and stored in a parameters database 342 within a database 340. Database 340 may be comprised in database 114 of platform 110. Examples of parameters that may be collected and stored by data-collection process 310 include various temperatures in engine 122, such as the ambient temperature (T1), the compressor discharge temperature (T2), the turbine inlet temperature (T5), oil temperature, and/or the like. The parameters may also include, without limitation, gas generator speed (NGP), engine load, the percentage of fuel that is pilot fuel (% Pilot), differential pressure (DP) across the combustor, the fuel specification, engine states, seasonality, engine speed, and/or the like.

It should be understood that data-collection process 310 may collect data from a plurality of machines 120. In this case, each parameter value or set of parameter values may be stored in parameters database 342 in association with (e.g., indexed by) an identifier of the machine 120 to which the parameter values pertain. Thus, a set of all parameter values (e.g., satisfying one or more criteria or filters, such as occurring in a given time period) for a given machine 120 may be easily retrieved from parameters database 342.

Database 340, which may be comprised in database 114 of platform 110, may also include a models database 344 that stores one or more digital models for each machine 120 or type (e.g., model or package) of machine 120. Models may be generated and/or stored in models database 344 via modeling process 320. In particular, an interface 322 may support physics-based modeling 324 and/or statistical modeling 326 of the emissions of a machine 120. Interface 322 may comprise a graphical user interface that enables a user of platform 110 to upload a model to models database 344, retrieve a model from models database 344, view a model stored in models database 344, build or otherwise define a model using physics-based modeling 324 and/or statistical modeling 326, edit or update a model stored in models database 344, and/or the like. Alternatively or additionally, interface 322 may comprise an API that provides functions for uploading a model to models database 344, retrieving a model from models database 344, defining a model using physics-based modeling 324 and/or statistical modeling 326 to be stored in models database 344, and/or the like. In general, interface 322 may enable users and/or other processes to add models, select models, customize models, edit models, deploy or enable models, list or otherwise identify models that have been deployed or enabled, and/or the like.

Models database 344 represents the hosting of models of remote machines 120 on platform 110. This enables the models to be defined, used, modified, updated, adapted, calibrated, shared, deployed, visualized, tested, trained, and/or otherwise managed, remotely, by a plurality of users of platform 110. Models database 344 may implement revision control to maintain different versions of each model to track revisions (e.g., timestamp, user identifier, comments, etc.) to each model, prevent conflicting revisions by different users, enable version control and rollback, and/or the like.

In physics-based modeling 324, one or more base physics-based models may be stored in models database 344. For example, a base physics-based model may be stored for each type (e.g., model or package) of machine 120 that is supported by platform 110. Interface 322 may be used to select one of these base physics-based models for a specific machine 120 and define a machine-specific physics-based model from the selected base physics-based model using specific physical characteristics of the specific machine 120.

Each physics-based model outputs the value of a target variable as a predicted emission. This target variable may be an amount of predicted emissions (e.g., volume, parts per million by volume, etc.), a classification representing relative emissions (e.g., low, normal, high), an emissions score, or the like. Each base physics-based model may comprise a mathematical representation of the behavior of a type (e.g., model or package) of machine 120, whereas each machine-specific physics-based model may comprise a mathematical representation of the emissions-related behavior of a specific machine 120.

Each physics-based model may incorporate physical characteristics of a turbomachine that represent a unique profile of the turbomachine, to enable numerical simulation of the emissions-related behavior of a specific machine 120. These physical characteristics may comprise airflow characteristics of the turbomachine. The airflow characteristics may comprise the airflow rate through the combustor of the turbomachine, the percentage of total airflow rate that is input to the combustor, and/or the like. The airflow characteristics for a particular machine 120 may be acquired during manufacture and assembly of machine 120 and incorporated into a machine-specific physics-based model for that machine 120. For example, the airflow through the combustor may be measured in a test cell during assembly of machine 120. It should be understood that the airflow characteristics only need to be acquired once for each machine 120, and can be expensive and difficult to acquire in the field.

In an embodiment, the physics-based model may be tailored from a base model to a machine-specific model for a machine 120 based on the specific airflow characteristics that were measured, for example, during assembly of that machine 120. For example, the airflow rate and/or other airflow characteristic(s), measured in the test cell, may be correlated to one or more parameters that are also measured in the test cell and which can be easily measured by sensor(s) 124 in the field. This correlation can be converted into a mathematical algorithm, lookup table, or other mapping, referred to herein as an "airflow fit," that enables the airflow rate and/or other airflow characteristic to be easily determined from the one or more parameters that are measured by sensor(s) 124 and collected by data-collection process 310, for example, in real time as machine 120 is operating. The physics-based model may be tailored to the specific machine 120 by incorporating this airflow fit to derive the airflow characteristics of the specific machine 120 from the parameter values collected for the specific machine 120 and stored in parameters database 342.

In an embodiment, the physics-based model utilizes the airflow fit to calculate the air flow characteristic(s), and then calculates the combustion primary zone temperature (TPZ) based on the calculated airflow characteristic(s), one or more fuel properties (e.g., fuel flow) derived from the fuel specification, and/or one or more other operating parameters. For example, these operating parameters may comprise the compressor discharge temperature T2 and/or the combustor differential pressure. The physics-based model may comprise a mathematical algorithm, lookup table, or other mapping that maps the primary zone temperature or a value derived from the primary zone temperature to a predicted emission value. For example, the value of the ratio of the primary zone temperature to the % Pilot may be mapped to the predicted emission value. In experiments, such a physics-based model was able to predict NOx emissions with an average difference of 0.8 parts per million from the actual measured NOx emissions. This is well within the 2 parts per million difference required by Performance Specification 16 (PS-16), published by the U.S. Environmental Protection Agency (EPA), for predictive emission monitoring systems in stationary sources.

In an alternative embodiment, the turbine inlet temperature T5 may be used instead of the primary zone temperature, thereby obviating the need to calculate the primary zone temperature. For example, the value of the ratio of T5 to the % Pilot may be mapped to the predicted emission value.

In statistical modeling 326, one or more base statistical models may be stored in models database 344. For example, a base statistical model may be stored for each type (e.g., model or package) of machine that is supported by platform 110. Interface 322 may be used to select one of these base statistical models for a specific machine 120 and define a machine-specific statistical model from the selected base statistical model by tuning one or more inputs to the statistical model.

Each statistical model outputs the value of a target variable that represents a predicted emission. This target variable may be an amount of predicted emissions (e.g., volume, parts per million by volume, etc.), a classification representing relative emissions (e.g., low, normal, high), an emissions score, or the like. Each statistical model may be a machine-learning model that accepts a feature vector of one or a plurality of time-correlated parameter values for a machine 120 as input and outputs the amount of predicted emissions, output by machine 120, given the parameter values in the feature vector. The machine-learning model may comprise a regression tree, classification tree, support vector regression (SVR), polynomial regression, random forest regression, logistic regression, a mixture density network, an ensemble of machine-learning algorithms, and/or the like.

It should be understood that each machine-learning statistical model may have been previously trained using any available supervised or unsupervised learning techniques. For example, in a supervised learning technique, a training dataset may be generated with feature vectors of the time-correlated parameter values, labeled with the ground-truth amount of emissions output by a machine 120 during occurrences of those parameter values. It should be understood that these labeled feature vectors with ground-truth amount of emissions may be derived through empirical observations of the actual operation of machine 120 or the same type of machine 120 and/or through simulations of machine 120. An initial machine-learning model may then be applied to each labeled feature vector from a portion of the training dataset and adjusted after each iteration (e.g., by adjusting weights in the machine-learning model) to minimize an error between the predicted amount of emissions and the ground-truth amount of emissions. The trained machine-learning model may then be validated and tested on the remaining portion of the training dataset to evaluate its accuracy. This learning process may be performed iteratively until an accuracy of the machine-learning model exceeds an acceptable threshold or no further improvement in accuracy is achieved.

The particular set of features to be used as input to each machine-learning statistical model may be determined during a feature selection process. In an embodiment, the parameters used as features to the machine-learning statistical model for a turbomachine comprise or consist of the engine load (e.g., in the case of a one-shaft engine) or NGP (e.g., in the case of a two-shaft engine), the % Pilot, the ambient temperature T1, and the turbine inlet temperature T5. These are all standard parameters of a turbomachine for which sensor data is typically available, such that no new hardware needs to be installed to enable utilization of the machine-learning statistical model. In experiments, a machine-learning statistical model, utilizing this set of features, was able to predict NOx emissions with an average difference from measured NOx emissions of 0.75 parts per million. However, it should be understood that this is merely one example, and that more, fewer, or different parameters may be used as the features to be input into the machine-learning statistical model.

In an embodiment, a base machine-learning statistical model may be trained for each particular type (e.g., model or package) of machine 120 managed by platform 110, using a training dataset compiled from measurements for a plurality of machines 120 of that particular type. For example, the training dataset may comprise feature vectors derived from the testing of hundreds of gas turbine engines of the same type. This training can be performed for each type of machine 120, such that a base machine-learning statistical model is stored in models database 344 for each type of machine 120 that is managed by platform 110.

In an embodiment, the statistical model may be tailored from a base model to a machine-specific model for a machine 120 based on parameter values obtained during operation of the machine 120. For example, a base machine-learning statistical model may be retrained using a training dataset of labeled feature vectors representing parameter values that were obtained from the specific machine 120, labeled with the ground-truth amount of emissions, to obtain a machine-specific machine-learning statistical model.

One or both of physics-based modeling 324 and statistical modeling 326 may include tuning of the respective model to more closely align with the specific machine 120 which the model is intended to represent. This tuning may represent additional or alternative tailoring of the respective model to make the model more machine-specific. In an embodiment, the tuning is performed by adjusting the value of the % Pilot that is input the model, to align the output of the model to the specific machine 120. In particular, if there is a significant difference between the emissions predicted by the model for a machine 120 and the measured emissions for machine 120, an offset or translation function may be applied to the parameter value that is collected for the % Pilot to adjust the parameter value that is input to the model, until the predicted emissions and measured emissions match within a tolerance range. For example, if the model is under-predicting emissions, the value of % Pilot may be increased by an offset prior to input into the respective model. Conversely, if the model is over-predicting emissions, the value of % Pilot may be decreased by an offset prior to input into the respective model. In other words, the model can be tuned to a particular machine 120 by adjusting the value of the % Pilot that is input to the model.

It should be understood that tuning of the % Pilot parameter is one example, and that one or more other parameters may be tuned in a similar manner. The tunable parameters may depend on the type of turbomachine, such as the model of turbomachine or the package of turbomachine. A package of turbomachine may be defined by a combination of engine rating, combustor liner, fuel injectors, and/or the like.

Whereas data-collection process 310 collects and stores parameter values of each machine 120 and modeling process 320 stores a physics-based and/or statistical model for each machine 120, model-execution process 330 retrieves a model from models database 344 and executes the model using the stored parameter values to generate predicted emissions 350. In the illustrated embodiment, a model is executed periodically. For example, the model may be executed automatically after each expiration of a predetermined interval of time (e.g., once every hour, once every twenty-four hours, once every week, etc.), automatically in response to another event (e.g., an event at machine 120 that is communicated to platform 110), in response to a user request (e.g., submitted via a graphical user interface provided by server application 112 and/or client application 132), and/or in response to any other type of trigger. In these cases, the model may be executed on batches of parameter values collected since the last execution of the model for a particular machine 120. In an alternative embodiment, the model may be executed continuously, in real time, as the parameter values are stored by data-collection process 310.

In subprocess 332, it is determined whether or not to execute the model. For example, it may be determined to execute the model in response to an event, such as the expiration of a predetermined interval of time, an event at machine 120, a user request, and/or the like. If it is determined not to execute the model (i.e., "No" in subprocess 332), model-execution process 330 continues to wait for a triggering event. On the other hand, if it is determined to execute the model (i.e., "Yes" in subprocess 332), a dataset is generated in subprocess 334.

In subprocess 334, the dataset may be generated from one or more parameter values in parameters database 342. In particular, for a given machine 120, a set of one or a plurality of parameter values, associated with the given machine 120, for a relevant time period (e.g., a sliding time window on which the model operates, a time period since the last execution of model-execution process 330, etc.) or in real time, may be retrieved from parameters database 342. It should be understood that the retrieved parameter values correspond to the inputs (e.g., features) of the model to be executed and/or are the parameter values from which those inputs are derived. In an embodiment, for a physics-based model, the retrieved parameter values may comprise values for one or more parameters used to calculate airflow rate, one or more parameters used to calculate TPZ, fuel properties, T2, combustor DP, and/or the like. For a statistical model, the retrieved parameter values may comprise, for example, values for engine load, NGP, % Pilot, T1, T5, and/or the like. In either case, the retrieved parameter values may be correlated by time and formatted into a dataset, for example, comprising one or a plurality of feature vectors derived from the retrieved parameter values.

In subprocess 336, a model is applied to the dataset generated in subprocess 334. In particular, the model may be retrieved from models database 344, and the dataset may be input into the retrieved model. It should be understood that the applied model may be a machine-specific model that has been tailored to the specific machine 120 for which emissions are being predicted. While this is not a requirement of any embodiment (e.g., a base model could be used), tailoring may be required to achieve the accuracy necessary to satisfy government regulations, such as PS-16 for predictive emissions monitoring systems. In an embodiment, either a physics-based model or a statistical model is applied to the dataset in subprocess 336. For example, a physics-based model may be used when an airflow fit is available for machine 120 and/or the other input parameter values required by the physics-based model are available from machine 120, and a statistical model may be used when an airflow fit is not available for machine 120 and/or only the input parameter values used by the statistical model are available from machine 120. In an alternative embodiment both a physics-based and a statistical model may be applied to the dataset, and the predicted emissions from both models may be combined in some manner (e.g., an average, a weighted average with different weights given to the different models, etc.). In another alternative embodiment, some other type of hybrid model may be applied to the dataset.

In an embodiment, interface 322 may enable deployment of a model as a microservice. In this case, subprocess 336 could call the deployed model directly, for example, over a network of platform 110 and/or from an external system via a microservice API. It should be understood that the call to the deployed model may include the dataset as input parameter(s).

The output of subprocess 336 is predicted emissions 350. In an embodiment, predicted emissions 350 comprise the amount of emissions (e.g., in parts per million). Alternatively, predicted emissions 350 may comprise a classification of the emissions (e.g., low, normal, or high). As another alternative, predicted emissions 350 may comprise an emissions score. In either case, predicted emissions 350 may also comprise a confidence value representing a confidence that the prediction is correct.

Predicted emissions 350, which may comprise the predicted amount of emissions, classification of emissions, emissions score, or the like for a machine 120 and a confidence value for that prediction, may be used for one or more downstream functions 360. Downstream function(s) 360 may include, without limitation, compliance tracking, health monitoring, alerts, notifications, visualization of and/or interaction with predicted emissions 350 via a graphical user interface (e.g., dashboard of a user account with platform 110), reports, control, and/or the like. At least some of downstream function(s) 360 may be remedial functions designed to prevent non-compliance of machine 120 with applicable emissions standards or prevent abnormal (e.g., unhealthy) operation of machine 120. For example, remedial functions may include an alert to an appropriate user or other recipient, a control of machine 120, and/or the like.

Predicted emissions 350 may be tracked over time for compliance with applicable emissions requirements. In particular, the amount of predicted emissions may be stored over the life of machine 120 to satisfy auditing or reporting requirements, such as Relative Accuracy Test Audits (RATA) per PS-16. This emissions history for each machine 120 may be stored in database 114 in association with a unique machine identifier, such that the emissions history can be easily retrieved for each machine 120 as needed. In addition, the emissions history can be monitored to identify trends in the emissions. For instance, unexpectedly high emissions may be indicative of abnormal operation of machine 120.

In the event that predicted emissions 350 indicate non-compliance with applicable emissions requirements, abnormal operation, and/or another problem, downstream function(s) 360 may send an alert to a user of platform 110 (e.g., representing an operator of machine 120) or otherwise notify the user. For example, an alert may be triggered when predicted emissions 350 satisfy one or more criteria, such as exceeding a threshold. The alert or notification may be sent via any communication method, including, without limitation, an internal message to a user account of the user on platform 110, presentation in a dashboard of the graphical user interface for the user account, email message to an email address of the user, text message (e.g., Short Message Service (SMS) or Multimedia Messaging Service (MMS) message) to a mobile telephone number of the user, telephone call with a recorded or synthesized message to a telephone number of the user, and/or the like. It should be understood that the communication method may be selected based on the urgency of the problem being reported, a user setting, a system setting, and/or the like. The alert or notification may identify the problem and/or comprise a recommended action, such as shutdown or maintenance of machine 120, repair or replacement of a component of machine 120, operation of engine 122 in a low-emissions mode, overhaul of engine 122, and/or the like. In an embodiment, a user may define and/or customize one or more alerts, for example, by specifying the threshold or other criteria for one or more parameter values to trigger an alert, specifying recipients of the alert, setting the communication method for the alert, specifying one or more automatic actions (e.g., controls) to be performed in response to triggering of the alert, and/or the like.

In an embodiment, predicted emissions 350 may trigger control of machine 120. For example, if the logic of downstream function(s) 360 determines that predicted emissions 350 is indicative of non-compliant and/or abnormal operation (e.g., satisfies one or more criteria, such as exceeding a threshold), the logic may generate and transmit a control command to ECU 126 of machine 120 (e.g., over network(s) 140) to initiate a transition of machine 120 to a different engine state (e.g., a low-emissions mode, a shutdown state, an idle state, etc.). As another example, downstream function(s) 360 could implement more complex logic that optimizes operation of machine 120 based on predicted emissions 350. Such optimization could also be based on parameter values from parameters database 342. This logic may continually and automatically generate and transmit control commands to ECU 126 of machine 120 (e.g., over network(s) 140) to transition machine 120 between various engine states in accordance with a determined optimal operation. Alternatively, the logic may provide recommendations to a user (e.g., representing the operator of machine 120), via a communication method, to be manually implemented by the operator for optimal operation of machine 120.

In an embodiment, health monitoring may be performed for each machine 120, periodically or in real time, to ensure that the machine-specific model associated with machine 120 is accurate. For example, the emissions history may be correlated with the parameter values in parameters database 342 and analyzed to ensure that the emissions history makes sense. Sensor values from ECU 126 may also be compared to historical ranges from engine 122 to verify the health monitoring. Additionally or alternatively, the emissions of a machine 120 may be physically measured, along with parameter values, and compared to predicted emissions 350 that are output for the measured parameter values by the model associated with the machine 120. If the difference between the actual emissions and predicted emissions 350 exceeds a tolerance range, the model associated with the machine 120 may be recalibrated (e.g., using any of the tailoring or tuning described herein) until the difference is within the tolerance range.

Downstream function(s) 360, which may be comprised in server application 112, may generate a graphical user interface with a user-specific dashboard for each user account and/or generate reports for one or more machines 120 managed by each user account, based on predicted emissions 350. The generated reports may be static reports (e.g., within the graphical user interface or as a data file) and/or interactive reports (e.g., within the graphical user interface and comprising inputs). Each report may comprise graphs, charts, tables, and/or other data derived from predictive output 350. The data may convey the amount of emissions output by machine 120 over a time period, a trend in the amount of emissions output by machine 120, compliance or non-compliance with applicable emissions requirements, the results of health monitoring, alerts applicable to machine 120, and/or the like.

INDUSTRIAL APPLICABILITY

The emissions of turbomachines are generally regulated by the government. Thus, it is important to accurately measure the emissions of a turbomachine over time. However, it can be expensive to install and maintain continuous emission monitoring systems.

Accordingly, a platform 110 for predictive emissions monitoring is disclosed. Platform 110 collects data for remote turbomachines, and utilizes physics-based and/or statistical models associated with each turbomachine to predict the emissions for that turbomachine based on the collected data for that turbomachine. The predicted emissions 350 may be monitored and used by downstream function(s) 360 of platform 110 for compliance, health monitoring, control, calibration, alerts, visualization, reporting, and/or the like. The emissions history for each turbomachine and/or one or more of these downstream function(s) 360 can be made available by platform 110 via the World Wide Web to user system(s) 130 anywhere in the world.

Platform 110 may also provide for the management of base models for particular models or packages of turbomachines. These base models can be assigned and tailored or tuned to any specific turbomachine, and continually calibrated over time, throughout the life of the turbomachine, remotely via platform 110. Notably, each model may be calibrated remotely, as needed, to pair the model with the specific turbomachine to which it is associated.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a turbomachine, such as a gas turbine engine or gas compressor, it will be appreciated that it can be implemented in various other types of machines and machines with emissions, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method of monitoring emissions of a turbomachine with at least one hardware processor, the method comprising:

with the at least one hardware processor:
storing a model configured to predict emissions of a remote turbomachine based on one or more parameters of the turbomachine;
over a plurality of iterations,
receiving data from the remote turbomachine over at least one network, wherein the data include values of the one or more parameters,
applying the model to the values of the one or more parameters to output predicted emissions of the turbomachine,
determining an offset based on a difference between the output predicted emissions determined by the model, and a measured emission of the turbomachine, and adding the predicted emissions adjusted by the offset to an emissions history for the remote turbomachine which is stored in a memory; and
monitoring the emissions history for compliance with at least one emissions requirement;
wherein the model comprises a physics-based model that determines one or more airflow characteristics of the remote turbomachine based on at least one the values of the one or more parameters;

wherein the physics-based model further determines a primary zone temperature of a combustor of the remote turbomachine based on the determined one or more airflow characteristics; and wherein the one or more parameters comprise a differential pressure of the combustor, and wherein the physics-based model determines the primary zone temperature further based on the differential pressure.

2. The method of claim 1, wherein the one or more airflow characteristics comprise an airflow rate through a combustor of the remote turbomachine.

3. The method of claim 1, wherein the one or more airflow characteristics comprise a percentage of total airflow rate that is input to a combustor of the remote turbomachine.

4. The method of claim 1, wherein the one or more parameters comprise one or more properties of fuel used in the combustor, and wherein the physics-based model determines the primary zone temperature further based on the one or more properties of fuel.

5. The method of claim 1, wherein the one or more parameters comprise a discharge temperature of a compressor of the remote turbomachine, and wherein the physics-based model determines the primary zone temperature further based on the discharge temperature.

6. The method of claim 1, wherein the one or more parameters comprise a percentage of pilot fuel in fuel used by the remote turbomachine, and wherein the physics-based model further determines the predicted emissions based on a ratio between the primary zone temperature and the percentage of pilot fuel.

7. The method of claim 1, wherein the one or more parameters comprise an inlet temperature of a turbine of the remote turbomachine, and wherein the model includes a physics-based model that determines the predicted emissions based on the inlet temperature.

8. The method of claim 1, wherein the model comprises a statistical model that includes a machine-learning model that has been trained to output the predicted emissions based on the values of the one or more parameters.

9. The method of claim 8, wherein the machine-learning model comprises a regression.

10. The method of claim 8, wherein the one or more parameters comprise one or more of an engine load of the remote turbomachine, a gas generator speed of the remote turbomachine, a percentage of pilot fuel in fuel used by the remote turbomachine, an ambient temperature in the remote turbomachine, or an inlet temperature of a turbine of the remote turbomachine.

11. The method of claim 1, wherein the one or more parameters comprise a percentage of pilot fuel in fuel used by the remote turbomachine, and wherein applying the model to the values of the one or more parameters comprises adjusting the percentage of pilot fuel based on an offset or translation function.

12. The method of claim 1, wherein the predicted emissions comprise a volume of nitrogen oxides (NOX).

13. The method of claim 1, further comprising using the at least one hardware processor to, in response to the predicted emissions satisfying one or more criteria, send an alert to at least one recipient.

14. The method of claim 1, further comprising using the at least one hardware processor to, in response to the predicted emissions satisfying one or more criteria, send a control command to the remote turbomachine, wherein the control command initiates a transition of the remote turbomachine from a first state to a second state that is different than the first state.

15. The method of claim 1, wherein the model is deployed as a microservice, and wherein applying the model comprises calling the model via a microservice application programming interface.

16. A system comprising:
at least one hardware processor; and
software configured to, when executed by the at least one hardware processor,
store a model configured to predict emissions of a remote turbomachine based on one or more parameters of the remote turbomachine,
over a plurality of iterations,
receive data from the remote turbomachine over at least one network, wherein the data include values of the one or more parameters,
apply the model to the values of the one or more parameters to output predicted emissions of the remote turbomachine, and
add the predicted emissions to an emissions history for the remote turbomachine in a memory, and
monitor the emissions history for compliance with at least one emissions requirement,
wherein the one or more parameters comprise a percentage of pilot fuel in fuel used by the remote turbomachine,
wherein the model determines a primary zone temperature of a combustor of the remote turbomachine based on at least one the values of the one or more parameters,
wherein the model further determines the predicted emissions based on a ratio between the primary zone temperature and the percentage of pilot fuel.

17. A method of monitoring emissions of a turbomachine with at least one hardware processor, the method comprising:
with the at least one hardware processor:
storing a model configured to predict emissions of a remote turbomachine based on one or more parameters of the turbomachine;
over a plurality of iterations,
receiving data from the remote turbomachine over at least one network, wherein the data include values of the one or more parameters,
applying the model to the values of the one or more parameters to output predicted emissions of the turbomachine,
determining an offset based on a difference between the output predicted emissions determined by the model, and a measured emission of the turbomachine, and
adding the predicted emissions adjusted by the offset to an emissions history for the remote turbomachine which is stored in a memory; and
monitoring the emissions history for compliance with at least one emissions requirement;
wherein the model comprises a physics-based model that determines one or more airflow characteristics of the remote turbomachine based on at least one the values of the one or more parameters;
wherein the physics-based model further determines a primary zone temperature of a combustor of the remote turbomachine based on the determined one or more airflow characteristics; and
wherein the one or more parameters comprise a percentage of pilot fuel in fuel used by the remote turbomachine, and wherein the physics-based model further determines the predicted emissions based on a ratio between the primary zone temperature and the percentage of pilot fuel.

\* \* \* \* \*